Sept. 8, 1931.  J. C. LEWIS  1,822,101
PISTON PACKING RING
Filed Aug. 19, 1930
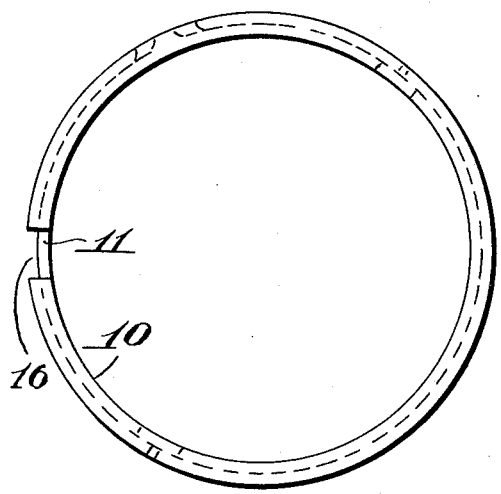
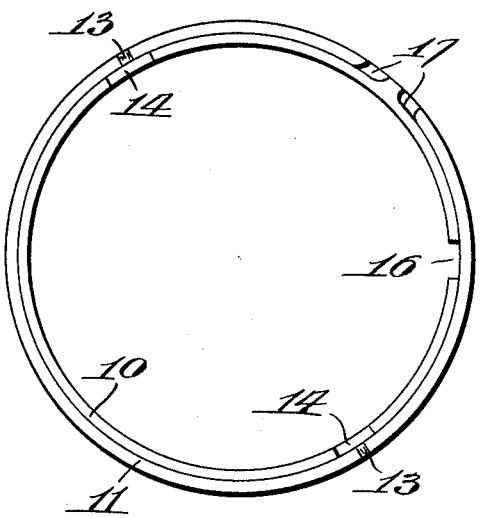
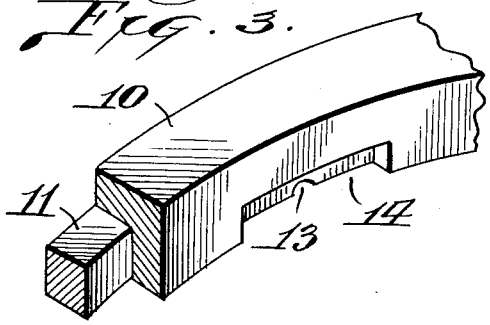
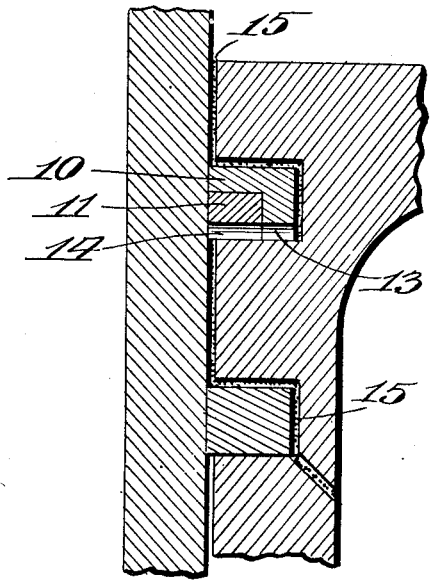
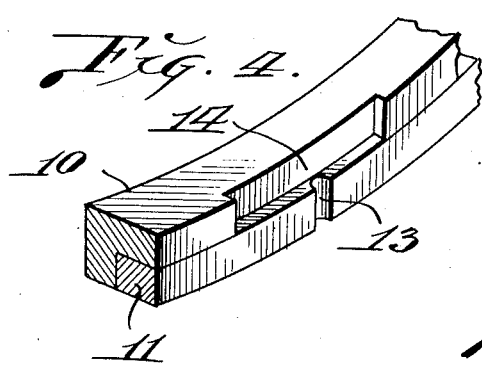
INVENTOR:—
JAMES C. LEWIS.
By Martin Smith, ATTY.

Patented Sept. 8, 1931

1,822,101

UNITED STATES PATENT OFFICE

JAMES C. LEWIS, OF LOS ANGELES, CALIFORNIA

PISTON PACKING RING

Application filed August 19, 1930. Serial No. 476,258.

My invention relates to piston packing rings of the type that are installed in the pistons of steam or internal combustion engines, pumps, compressors or the like, for the purpose of sealing, on every cycle of the piston, the space between the peripheral surface of a piston and the surrounding cylinder wall, and the space between the ring and groove lands of the piston and to especially prevent, in an internal combustion engine, the compression passing from the combustion chamber to the crank case and to prevent the oil passing from the crank case to the combustion chamber.

The principal object of my invention is, to construct a piston packing ring that will effectively eliminate the pumping of oil from the crank case of an internal combustion engine, past the piston ring to the combustion chamber and that will permit the escape, past the ring, of only a regulated or desired amount of compression from the combustion chamber, sufficient only to remove an excess amount of oil from the space between the ring next to the combustion chamber and the groove land of the second ring.

After repeated tests and considerable research, I have discovered, first, that the vacuum in the combustion chamber of a four cycle internal combustion engine on the intake stroke, fills with oil, all the space between the piston and cylinder wall and the space around the ring in the groove, second, that unless vacuum vents, discovered necessary by me, are properly distributed around the ring, the compression stroke of the engine will carry the oil to the top of the cylinder, third, that the power stroke will distribute this oil along the cylinder wall, fourth, that the scavenging stroke will then scrape the oil from the wall and empty it into the combustion chamber, fifth, that the vacuum developed by the use of absolutely air tight piston rings and the partial vacuum developed by the use of near air tight rings, in the space immediately displaced by and following the piston ring during its upward travel on the compression stroke, creates sufficient suction or lifting effect to fill the space between the cylinder wall and the piston with oil, unless vacuum vents in accordance with my invention are properly distributed around the ring, sixth, that, due to the space surrounding the piston being small at the bottom and large at the top, similar to a wedge or funnel, the power stroke of the engine can not act as a scavenging stroke to clean the cylinder walls and ring grooves of excess oil and dump it into the crank case through the small end of the wedge shaped space, seventh, that, on the explosive or firing stroke of the engine, unless the piston rings used are provided with vacuum vents, the power pressure on the oil surrounding the piston will combine with the adhesive force of the oil to the cylinder wall, to create a hydraulic upward pressure against the ring far greater than the resilent force or tension of the ring against the cylinder wall, which will force the ring to ride the oil on the power stroke, and distribute it along the cylinder wall, eight, that, the scavenging stroke of the engine will then dump the oil into the combustion chamber where it should not be, and ninth, that, the above described objectionable pumping of lubricating oil from the crank case to the combustion chamber and the undesirable results therefrom, namely, excessive use of oil and the consequent production of smoke and carbon, may be entirely overcome, by constructing the piston packing ring with vacuum vents, notches or grooves on the seating side of the ring as determined by the compression stroke of the engine, and which vents will function to break or prevent the developing of a vacuum below the ring.

I have further discovered, by using piston rings having vacuum vents, how to regulate the amount of compression leakage by the rings, so that it will be sufficient only, to remove the excess oil below the ring into the crank case, but which will not allow such an amount of compression to leak by the rings as to reach the crank case. My invention permits the use of a very small quantity of the stored energy in the combustion chamber of an internal combustion engine on the compression cycle or stroke, to do the work of removing to the crank case, the excess oil below the ring next to the combustion chamber.

The primary object of my invention is, to construct the piston ring or the parts thereof so as to prevent the pumping action of rings used in four cycle combustion engines and to relieve their tendency to create a vacuum on the opposite side of the ring from the combustion chamber on the compression cycle or stroke of the engine.

With the foregoing and other objects in view, my invention consists in certain novel features of construction and arrangement of parts that will hereinafter be more fully described and claimed and illustrated in the accompanying drawings, in which:

Fig. 1 is a top plan view of a two part piston packing ring that is constructed in accordance with my invention.

Fig. 2 is a view looking against the underside or seating side of the ring.

Fig. 3 is a perspective view of portions of the ring showing the coinciding vacuum vents or notches formed in the lower portions of the parts thereof.

Fig. 4 is a perspective view similar to Fig. 3 and showing a modified arrangement of the vacuum breaking notches or vents.

Fig. 5 is an enlarged detail section showing portions of an engine cylinder wall and the piston therein with a packing ring of my improved construction seated in a groove of a piston.

Referring by numerals to the accompanying drawings which illustrate a practical embodiment of my invention, 10 designates a one piece split ring which is substantially of inverted L-shape in cross section and positioned within the space between the legs or flanges of this ring is a one piece split ring 11. Ring 10 is open at 16, ring 11 is open at 17.

Where an entire section of one of these rings 10 or 11 is cut out, the other ring is continuous, a portion of the ring 10 spans the gap between the ends of ring 11 and likewise a portion of ring 11 spans the gap between the end of ring 10.

The two rings have their bottom and outer surfaces flush with each other. They are made of suitable metal, preferably cast iron, and have a certain degree of resiliency, and when seated in the groove of a piston and inserted closed in the cylinder, they tend to expand and thereby produce a fluid pressure tight joint between the outer faces of the rings and the adjacent cylinder wall and likewise, they produce a fluid pressure tight joint between the groove land of the piston and the adjacent face of the ring except at the vacuum vents uniformly distributed around the ring where only a certain desired leakage takes place.

Where the ring is constructed with my vacuum vents or grooves so as to allow for only enough compression leakage to empty into the crank case the excess oil 15 that immediately follows the ring next to the combustion chamber during the compression stroke of the piston, a narrow transverse notch or groove 13 is formed in the underface of ring member 11 on the opposite side of the ring to the combustion chamber and the inner end of the notch or groove coincides with an elongated notch or slot 14 that is formed in the lower edge of the depending flange of ring member 10.

This vent, notch or slot 14 is made substantially longer than the notch 13 in order that the two notches will always register regardless of the expansion and contraction of the complete ring while positioned in the groove in the piston.

As a modified arrangement of the construction just described, I have shown in Fig. 4, the notch 13 formed in the outer face of the lower ring 11 and the elongated notch or groove 14 formed in the outer portion of the horizontally disposed flange of ring 10 and which arrangements accomplish the same result as the construction illustrated in Fig. 3.

When a ring of my improved construction is seated in a groove in the piston as illustrated in Fig. 5, there is usually two or three thousandths of an inch clearance between the face of the ring and the adjacent faces of the groove. The piston ring when installed in the cylinder is closed or contracted and as it is resilient, it normally tends to expand and thereby seals the space between the piston and the inner face of the cylinder wall.

In Fig. 5 the space between the two groove lands is shown filled with oil and which in accordance with the principal object of my invention is to be kept out of the combustion chamber and returned to the crank case.

Where my improved rings are utilized, the coinciding notches 13 and 14 provide a duct, that permits the passage of sufficient amount of air or gases to counteract the development of vacuum or suction immediately following the piston ring during the compression stroke of the piston and, as a result, there will be no suction or pull on the oil tending to pump the same past the piston ring into the combustion chamber.

Heretofore the object of all piston ring inventors, designers and users has been to seal, insofar as possible, the combustion chamber from the crank case and to make the sealing absolutely leak proof and to let no compression escape past the ring.

The purpose of my invention in respect to compression is different.

The purpose of my ring is not to seal absolutely, but to control and let pass, at certain intervals around the ring, a desired or predetermined amount of compression to do the work of removing the excess oil to the crank case.

In order for a resilient or expansive type of ring to function, it is necessary to make the ring larger than the cylinder and to cut a certain amount out of the ring so that when it is inserted in the cylinder it will be closed except for a gap of a few thousandths of an inch to allow for expansion.

A one-piece type ring will seal the space between the piston and cylinder wall and will seal the crank case from the combustion chamber except where this gap occurs. As the cylinder and ring wear, the gap will enlarge and the value of the ring as a packing against compression or oil is impaired or destroyed.

My invention seals this gap and opens vents the size of which remain constant. The wear on the ring and cylinder wall does not effect the vents. There are two piece types of ring that effectively seal this gap against compression.

The designers of such rings, have endeavored to seal absolutely against any compression leakage whatever, which transforms the piston and ring into an oil pump, especially so in four-cycle internal combustion engines, and in such cases, the damage caused by the pumping of oil past the piston ring is greater than the relief gained by holding the compression.

My invention takes care of the oil and also stops the compression leakage into the crank case.

Thus it will be seen that I have provided a piston packing ring that is constructed so as to automatically prevent the tendency of piston rings to form a vacuum and consequent suction, in the space immediately following the ring during the compression stroke of the engine, that I have provided a piston packing ring having no gap or opening along the cylinder wall or along the seating side of the groove land except the vacuum vents, that I have provided a ring which uses a small amount of the compression stored in the combustion chamber on the compression stroke, for the purpose of doing the work of removing an objectionable amount of oil immediately following the ring to the crank case.

The vacuum counteracting vent contemplated by my invention, may be employed with rings composed of one or more parts and likewise may be employed on the seating side of the ring opposite the combustion chamber, of one piece piston rings of standard construction and which have overlapping or otherwise fluid pressure sealed ends or end portions.

It will be understood that minor changes in the size, form and construction of the various parts of my improved piston packing ring may be made and substituted for those herein shown and described without departing from the spirit of my invention, the scope of which is set forth in the appended claim.

I claim as my invention:

A piston packing ring comprising two resilient split rings, one of which is of inverted L-shape in cross section, the other ring being substantially rectangular in cross section and positioned between the flanges of the L-shaped ring, cooperating means between the two rings for permitting a limited degree of circumferential movement of said rings relative to each other, both rings being provided in corresponding faces with coinciding notches, one of which is larger than the other so that said notches are in registration at all times during relative movement of the rings with respect to each other.

In testimony whereof I affix my signature.

JAMES C. LEWIS.